Figures 1, 2:
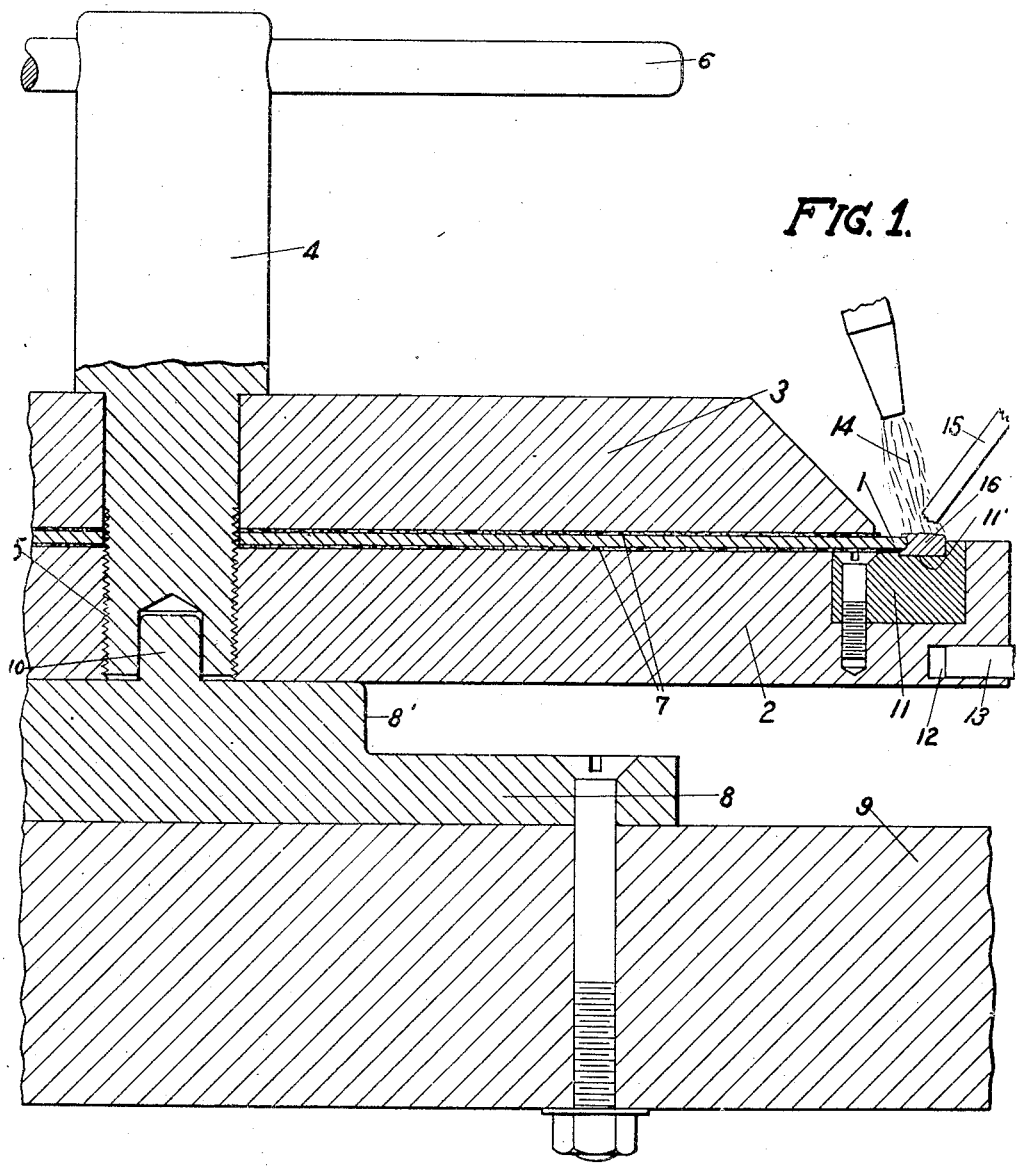

INVENTOR.
JOSEPH P. BEM
BY Miller Boyken & Bried
ATTORNEYS.

Patented July 25, 1933

1,919,358

UNITED STATES PATENT OFFICE

JOSEPH P. BEM, OF OAKLAND, CALIFORNIA, ASSIGNOR TO PACIFIC PITTING MACHINE COMPANY INC., OF FRESNO, CALIFORNIA, A CORPORATION OF CALIFORNIA

CIRCULAR SAW AND METHOD OF MAKING THE SAME

Application filed May 18, 1932. Serial No. 611,072.

This invention relates to circular saws and has for its objects a process for producing a circular saw with an extremely hard alloy cutting edge, also a saw made by the process.

In the drawing accompanying this application Fig. 1 is a vertical cross section of a portion of the apparatus and saw disk clamped thereon during the application of the hard alloy edge.

Fig. 2 is a plan of a portion of the completed circular saw.

Before describing the invention it may be said that many attempts have been made to increase the wear-resisting ability of saws by case hardening the teeth only, so as to preserve a certain amount of flexibility to the body. Also, in the case of hacksaw blades these have been made by welding together a flat strip of hard steel to a flat strip of soft steel and the teeth formed in the hard steel strip.

Such saws, however, have not been very satisfactory, the former by reason of the teeth cracking off easily in use, and both by reason of warpage, but since hacksaw blades are tensioned in frames in use they gave fair service, though even today the all-hard hacksaw blade is the common one in use.

The same treatment has never been applied to circular saws insofar as I am aware, and regular metal cutting circular saws are always of the all hard variety, though at this, considerably lacking in hardness as compared to a hacksaw.

In very large circular saws inserted teeth of special steels are used, but no improvement in the smaller saw disks from six inches to a couple of feet in diameter has been seen on the market in years, as it has been generally considered impossible to make a composite circular saw in thin metal on account of any unequal expansion or contraction tending to warp the disk.

In experimenting to produce a circular saw which has long life, yet not be hard over all I found that with certain precautions taken during the process an extremely hard rim could be built up on a thin saw disk without injuriously warping the same, so that when teeth were subsequently ground into the rim the saw would outlast a dozen of the best circular saws heretofore obtainable.

The process was to clamp an ordinary steel disk firmly between a pair of heavy blocks leaving the margin of the disk exposed, and building up or rather outwardly from the margin a rim of superhard metal alloy therearound by melting with a torch.

The hard alloys useful in this connection are such as sold under the various trade names, Stellite, Stoodite, Cristite, Carboloy, etc., and which are thought to be compounds respectively of chromium, cobalt, molybdenum or tungsten,—chromium and iron carbide—tungsten, molybdenum and chromium—tungsten, chromium carbon and cobalt. The former in the grade known as #12 being found perfectly satisfactory. The various disk bodies used were of common saw steel, cold rolled steel; Monel metal, and stainless steel.

The invention was carried out by means of the equipment shown in the drawing, and wherein 1 is a centrally apertured, relatively soft steel circular disk body (drawn full size for about a foot in diameter saw), 2 and 3 a pair of thick circular cast iron plates between which the disk 1 is firmly clamped by means of a shouldered screw bolt 4 threaded into the lower plate at 5 and preferably fitted with a vise handle 6 at its upper end.

Inserted at both sides of the saw disk are sheets of asbestos 7.

The assembled disks are rotatably supported on a bench plate 8 which may be firmly bolted to a work bench 9 and which plate has a hub 8' provided with a centering pin 10 seated in a hole drilled into the lower end of the bolt 4 so that the assembled clamp plates and saw disk may be turned in a horizontal plane.

The upper plate is about $\frac{7}{8}$ of an inch smaller than the saw disk at all sides and is beveled inward as indicated so that it will not be too near the welding flame.

The lower plate projects about an inch or more beyond the saw disk clear around and carries a heavy inserted ring of copper 11 held in place as by screws indicated so that it may be replaced when necessary. This copper ring extends under the saw disk about half the width of the ring and is recessed with a slight depression 11' on its upper face which also extends about $\frac{1}{16}$ of an inch under the edge of the disk and about $\frac{5}{16}$ of an inch or more outward of the disk, depending on the width of alloy ring it is intended to apply. The outer edge of the lower plate 2 is provided with holes 12 spaced an inch or two apart so that a bar 13 can be inserted for turning the assemblage slowly or from time to time as the alloy ring is applied.

To apply the alloy I preferably use the acetylene welding flame 14 and a rod of the alloy, preferably coated with a suitable flux, or the flux otherwise applied. A flux found satisfactory is a market article sold under name "Oxweld" cast iron flux.

The rod is melted and the alloy built up slightly higher than the saw disk, and the assemblage turned until the rim is completed clear around the disk. The recessed depression 11' in the copper ring insures the alloy rim extending slightly beyond the lower face of the disk, and the outer margin of the recess forms a guide for uniform width of the alloy ring.

In the drawing the alloy ring is indicated at 16, and it will be noted that the saw body disk is slightly rounded at its edges, as this has been found advantageous to prevent burning of the extreme corners.

The inserted copper ring has the property of not becoming attached to the molten alloy yet limits the flow so as to preserve the right thickness of the built-up rim.

Bronze also has somewhat this effect. If the ring becomes injured it may easily be removed for refinishing or renewal.

When the alloy rim is built up clear around, the heat of the parts is allowed to disseminate somewhat and the disk is removed, and both the disk and built-up rim ground on both sides, while leaving the rim just a trifle thicker for clearance in use. The outer edge is also ground to a true circle and the teeth 17 ground into the alloy so as to form the completed saw as shown in Fig. 2.

Since there is a certain amount of contraction in cooling of the built-up alloy rim, it is advantageous before clamping the body disk between the plates, to stretch the margin slightly as by light peening therearound so as to make a slight waviness to the rim, but which is flattened out by clamping in the plates. This seems to take care of the shrinkage of the alloy rim, though flat results can be made without this peening.

Also to be noted is that in spite of the superhardness of the continuous alloy rim slight corrections for trueness of blade may be made by peening the sides of the blade after removing from the clamps both before as well as after grinding.

In considering my invention it might be thought that it was no more than hard steel facing of a cutting tool, but since such application entirely around a thin saw disk is quite different than edging heavy tools or edging teeth only on larger saws, and has heretofore been considered impossible to accomplish, I feel that it is an important achievement in the art, especially since such a saw has been found in actual test to outlast a dozen of the best saws obtainable and the reason for the success of my invention I believe due largely to the solid clamping of the disk between the heavy iron plates, together with the application of the intense welding heat quickly to but a small portion of the rim at a time close to a good conductor of heat in the heavy copper ring below, besides other physical features not clear to me, for when well performed the result is a thin circular saw disk of tough steel with a glass hard alloy rim clear around integrally united and free from cracks, though in some cases a slight radial crack has appeared in the alloy rim after grinding but has been found to be of no consequence as not the slightest section has ever become detached in use.

I therefore claim:—

1. The process of making a circular saw which comprises stretching the edge of a tough metal disk slightly, welding a hard alloy rim around the edge of the disk, and cutting teeth into the alloy rim.

2. A circular saw comprising a flat body disk of flexible tough sheet metal provided with teeth of hard metal alloy built up around the disk and integrally united thereto by welding process from the molten alloy.

3. A circular saw comprising a flat body disk of flexible tough sheet metal provided with teeth of Stellite built up around the disk and integrally united thereto by welding process from the molten Stellite alloy.

4. A circular saw with a body disk of flexible tough sheet metal and an integrally united continuous rim entirely around the disk composed of a hard alloy and with the teeth ground into the alloy rim.

5. The process of making a circular saw which comprises reducing the edges of a round tough sheet metal disk slightly, and building outwardly entirely around said disk a rim of hard non-ferrous alloy from a molten state while clamping the disk between rigid plates, and grinding teeth in said rim.

JOSEPH P. BEM.